INVENTOR.
James F. Wygant

INVENTOR.
James F. Wygant
BY
Everett A. Johnson
ATTORNEY

United States Patent Office 2,892,510
Patented June 30, 1959

2,892,510

HIGH TEMPERATURE GAS AND SOLIDS FILTER

James F. Wygant, Rich Township, Cook County, Ill., assignor to Standard Oil Company, Chicago, Ill., a corporation of Indiana Application August 8, 1957, Serial No. 677,089

5 Claims. (Cl. 183—41)

This invention relates to improvements in filters and more particularly relates to systems for separating finely divided solids from gasiform fluids at high temperature.

The problem of removing finely divided solids from hot gases is common in fluidized catalyst reaction systems and ceramic filters have been proposed for this purpose but have not been heretofore found satisfactory. For example, tubular filters suspended by collars or flanges at top ends have failed in hot gas service. This failure has been caused primarily by mechanical and thermal stresses, the tubes acting as fixed-end cantilevers.

In such a system a contacting gas is passed upwardly through a catalyst bed, the reacted gases being withdrawn through a top portion of the contacting vessel. The removed gases contain small amounts of entrained fine catalyst and these entrained catalyst fines must be removed from the gases in order to avoid plugging subsequent process equipment and in order to avoid contamination of the product.

Several means are available for this separation, such as electrostatic precipitation, cyclone separators, oil or water scrubbing, and filtration. Cyclones are not capable of removing the finest solids; electrostatic precipitation is an incomplete separation in units of practical size; oil or water scrubbing wastes much of the sensible heat of the product and also complicates subsequent processing.

Both for complete separation of entrained catalyst fines and for conservation of sensible heat, hot gas filtration is preferred.

It is, therefore, a primary object of this invention to provide a tubular ceramic filter apparatus which avoids the undesirable cantilever and fixed-end characteristics. A further object of the invention is to provide a system which is resistant to mechanical stresses and vibration. Another object of the invention is to provide a system of substantially greater strength than heretofore possible while having substantial resistance to thermal shock. Still another object of the invention is to provide a filter unit which is compact and which may be readily used in various types of vessels. An additional object of the invention is to provide a filter structure which may be used in parallel with similar filter structures and wherein the failure of one will not permit bypassing of unfiltered gases.

These and other objects of the invention will become apparent as the description thereof proceeds.

Briefly, according to this invention, a tubular ceramic filter is held in axial compression by a spring and tie rod. One end of the tubular filter is provided with an endclosure and the unit is adapted to be secured to or through a support or a vessel wall. The tie rod is provided with a valve closure which cooperates with the outlet pocket of the filter structure so as to take the particular filter unit out of service in the event of failure of the ceramic tubular filter element.

Further details and advantages of the invention will be described in conjunction with the accompanying drawings wherein.

Figure 1:
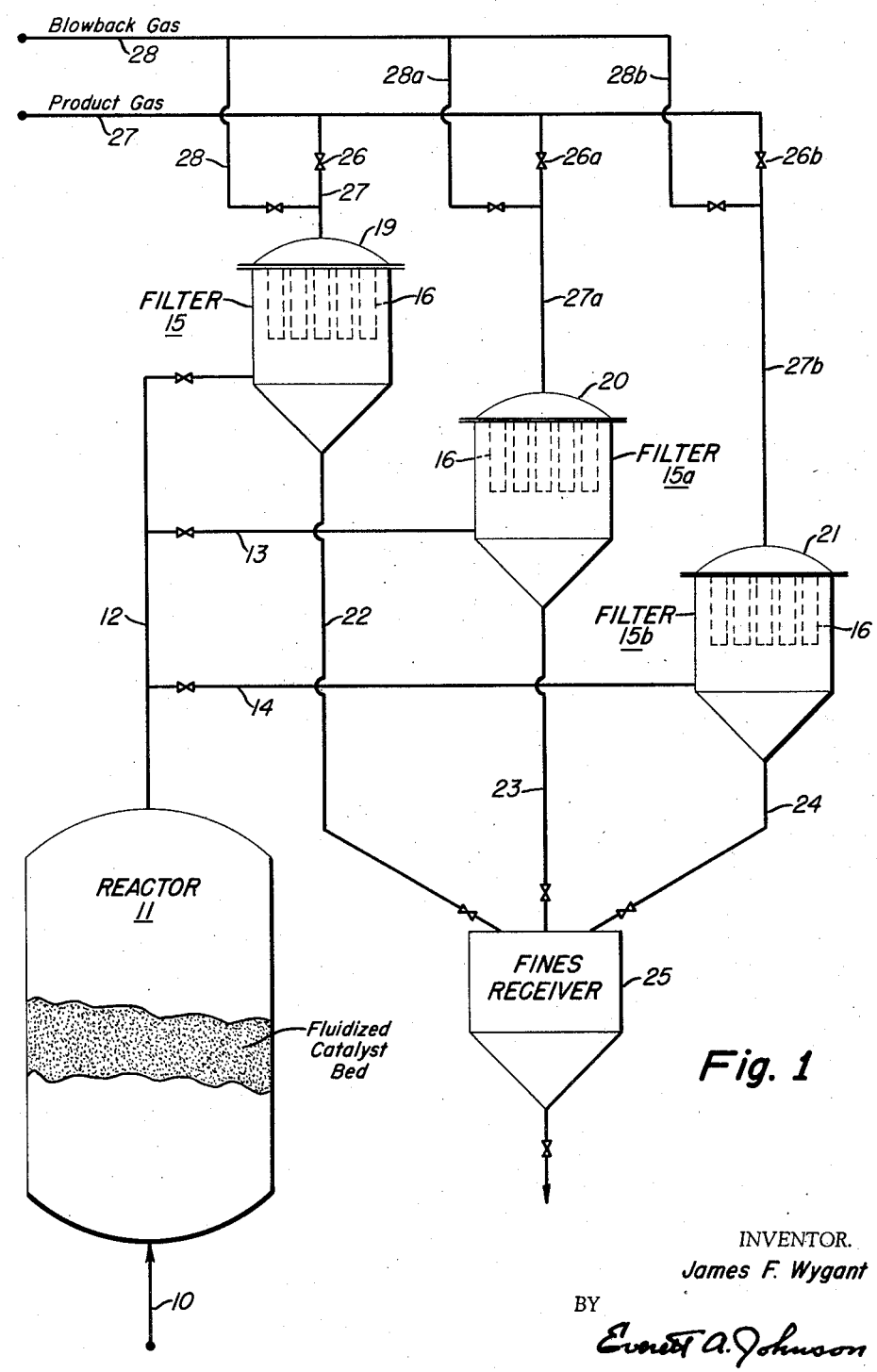
Figure 1 is a diagrammatic representation of a typical fluidized catalyst gas reaction system employing filter units constructed in accordance with this invention.

Referring to Figure 1, feed gas from line 10 enters the reactor 11 containing a fluidized catalyst bed. The effluent gases from reactor 11 are conducted by overhead lines 12, 13, and 14 to the associated filter cases 15, 15a, and 15b. Within the filter cases a plurality of filter units 16 are supported by a tube sheet 18. The filtered gases collect within the headers 19, 20, and 21 with the removed solids accumulating within the lower shells of the filter cases and flowing by discharge lines 22, 23, and 24 into the fines receiver 25.

As finely divided solids are separated from the gases by the filters 16, the solids build up in a "cake" on the outer surfaces of the filter tubes 17. This results in either a decrease in the flow rate through the filter or an increase in the pressure drop through the filter. In either event, it is desirable to limit the rise of pressure drop or the decrease in flow rate, and this is done by "blow-back."

The flow of product gas through one of the parallel filter cases 15, 15a, and 15b is shut off by one of valves 26, 26a, and 26b in transfer lines 27, 27a and 27b. Gas at a pressure higher than that of the reaction system is introduced through valved line 28, 28a, or 28b downstream of the filter case in question and such blow-back gas flows through the bank of filters in reverse direction. Ordinarily the operating flow is from the outside of the filter unit toward the hollow core.

With multiple filter cases, cyclic blow-back schedules may be established so that at approximately uniform intervals one filter case is blown back while the others remain in operation. During blow-back of one filter case, the blow-back gas is caused to flow backward through the product line 27, joining the product gas which is being exhausted from reactor 11 through line 12, 13, or 14 into the remaining filter cases. If a gas other than the filtered product is to be used for blowback and it is not desirable that it mix with the product gas, block valves may be placed in the product inlets to the cases and auxiliary outlet lines with valves can be provided for exit or blowback gas.

Figure 2:
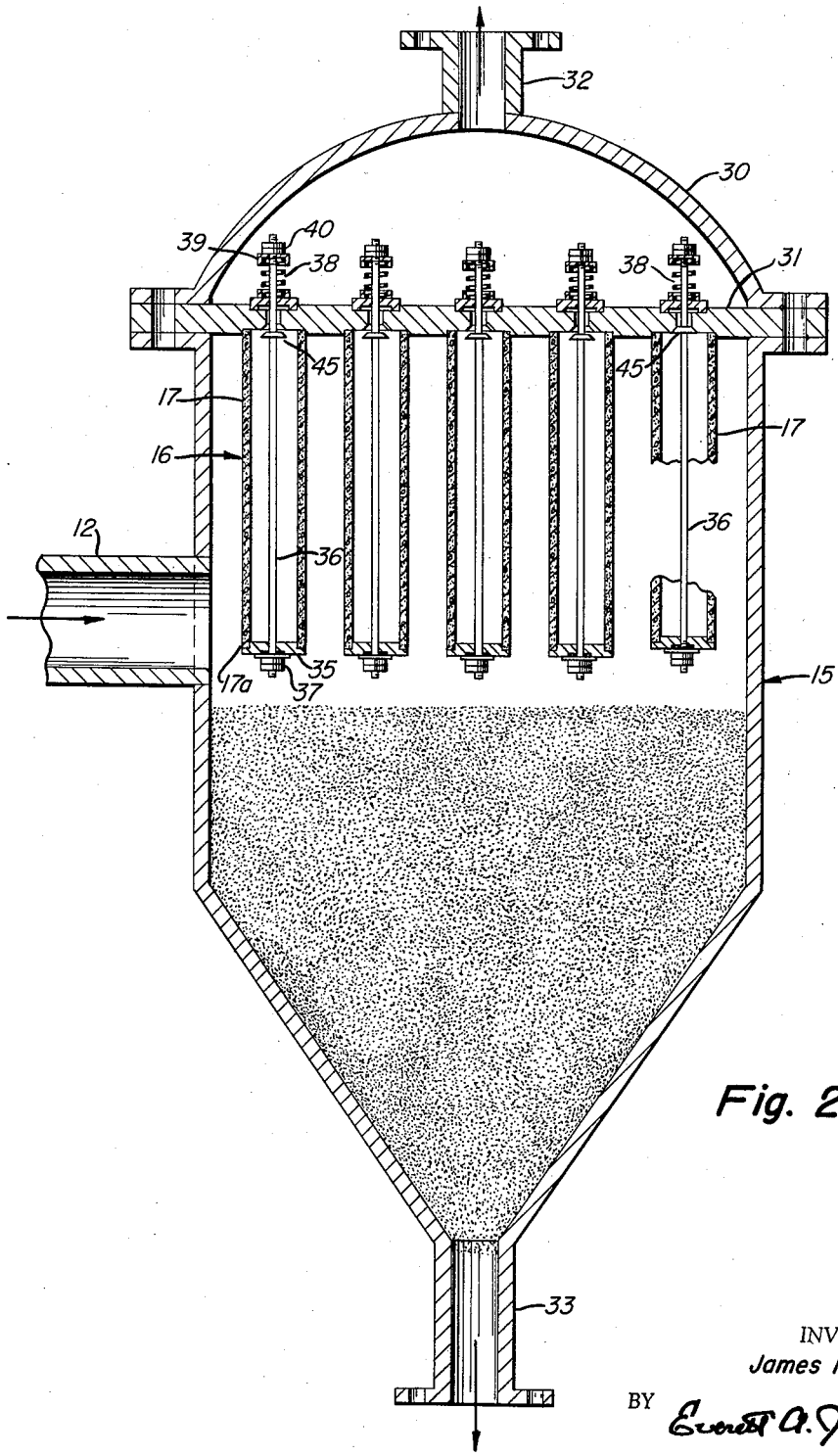
Figure 2 is a vertical section of a filter case, such as employed in the system of Figure 1.

In Figure 2 the filter case 15 is provided with the header 30 and the tube sheet 31 from which the filter units 16 are suspended. The filtered gases are withdrawn from the header 30 by a nozzle 32 and the separated solids are withdrawn from the conical shell of the filter case 15 by means of connection 33.

The tubular filter 17 may be of any reasonable length and tubes 36" or longer may be used. It also is feasible to make long elements by abutting shorter ones having square-cut ends, using gaskets between short lengths. Slight angular misalignment (1 or 2 degrees) causes no difficulty.

The upper and lower ends of the filter tubes 17 have square ends and the tube walls are relatively thick in comparison to diameter, for example 0.5" or more thick in a 3.0" O.D. tube 17. The tube material is an inorganic refractory and for most purposes silicon carbide is preferred. Other materials, such as aluminum oxide, synthetic mullite, etc. may be used instead of silicon carbide, particularly under highly oxidizing conditions.

The tubes 17 may be formed in any conventional manner. They may be self-bonded by heating; bonded by addition of clay, glass, feldspar, or other vitrifiable materials which bond upon heating, or bonded by addition of certain chemicals, such as phosphates or silicates.

The end closures 35 are of heat resisting steel and engage the lower ends 17a of the tubular filter elements 17. A tie rod 36 passes longitudinally through the tubular filter element 17 and extends below the closure 35 and above the tube sheet 31. The lower end of the tie rod 36 is secured outside of the closure 35 by such means as welding, an upset head, a welded head, a pin or wedge, or by nuts 37 as shown.

A spring 38 concentric to the tie rod 36 and at the upper end thereof is supported above the tube sheet 31 and compressed under the washer 39 so that the tie rod 36 is in tension. This tension is calculated to withstand any internal pressure on the closure 35 during blow-back but to be well below the axial force bearable by the ceramic tube 17. It is, however, desirable that the tension be substantially above the blow-back forces, in order to keep the tube firmly seated against the tube sheet, especially in the presence of transverse vibration. The head or washer 39 is adjustable on the rod 36 by means of lock nuts 40.

The gaskets 41 and 42 disposed across ends of the ceramic tube 17 may be of asbestos or other material suitable to the operating temperature and the seal washers 43 and 36b can be similarly constructed.

Figure 3:
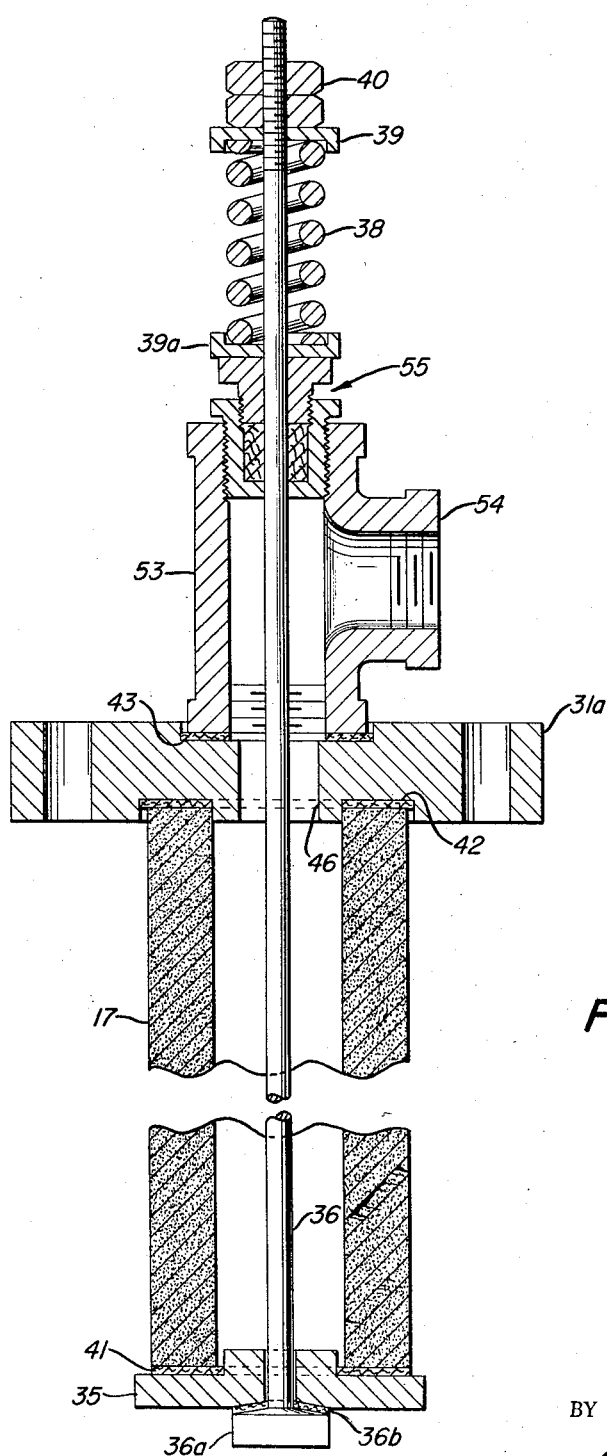
Figure 3 is a vertical section of one embodiment of a tubular filter mounting adapted for use in a filter case, reactor, etc.

In Figure 3, the T fitting 53 is provided to accommodate a valve (not shown). The orifice 46 may discharge directly into a header above a tube sheet on which top closure plate 31a is fixed. However, for individual filters or for filters manifolded externally by piping, we include the nipple 54 on T fitting 53 for connection to such piping. A packing gland 55 about the tension rod 36 is also included in such assembly but may be omitted when the individual filters discharge to an internal header.

Figure 5:
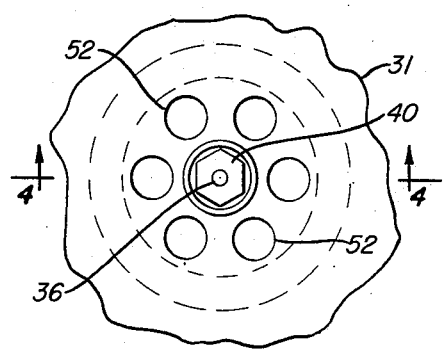
Figure 4 is an elevation-in-section and Figure 5 is a plan view of another embodiment of the tubular filter mounting system.
Figure 4:
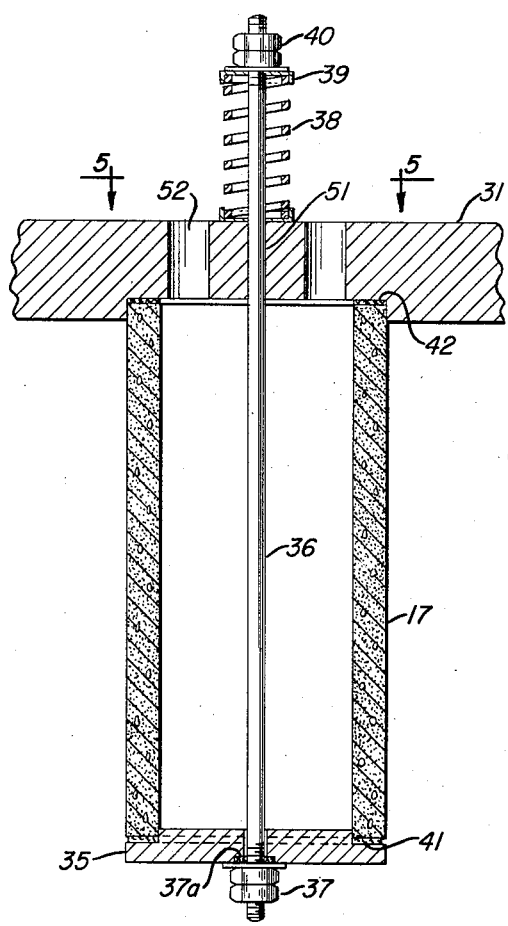
Figure 6:
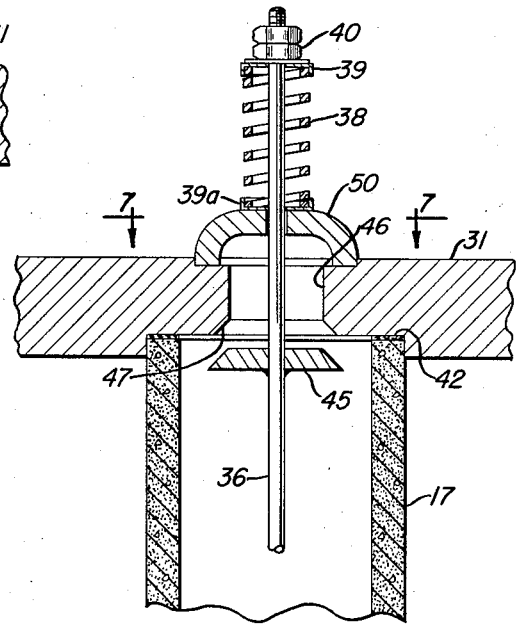

Figures 4 and 5 illustrate an assembly for mounting the filter tubes 17 on tube sheet 31 without a valve mechanism. In this embodiment, the single orifice 46 of Figure 6 is replaced by a center bore 51 accommodating the tension rod 36 and a plurality of ports 52 are arranged about the bore 51 to provide adequate area for gas flow.

Our arrangement provides concentric loading of the tubular elements 17 by the tension rod 36 and the length of the tubular filter element 17 may be as much as 300 times its diameter if the ends are essentially square. A tube 17 of practical size, e.g. four feet long and 1.75 inches in diameter, will always crush before it will buckle, even if the loading is not absolutely concentric.

The apparatus shown in Figures 4 and 5 is particularly adapted for those uses where a spring 38 may not be permissible. The tension rod 36 is of an alloy selected to have a thermal expansion very closely approximating the weighted average of the ceramic tube 17 and the end closures 35. The alloy may be Kovar, Invar, etc., and if a very closely matching thermal expansion is desired, the tension rod 36 may consist of suitable lengths of metals having varying thermal expansion coefficients, such as Kovar or Invar, ferritic stainless steels and austenitic stainless steels.

If the temperature of service is such that only selected austenitic alloys may be used for the tension rod 36, a symmetrical group of curved or bent tension rods of a highly creep-resistant alloy may be substituted for the unitary tension rod 36. The number and size of such multiple rods in the symmetrical grouping are calculated from the creep strength of the alloy and the desired total force or loading of the tubular filter 17.

Figure 7:
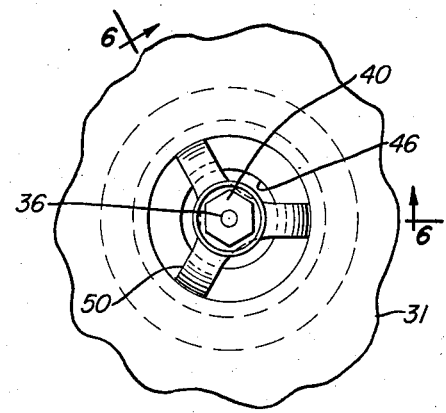
Figure 6 is a fragmentary elevation-in-section and Figure 7 is a plan view of a third embodiment of a tubular filter mounting.

The embodiment of the invention shown in Figures 6 and 7 comprises a valve plug 45 which closes the orifice 46 in the tube sheet 31 in the event that the ceramic filter tube 17 is broken so as to fragment and to release the tension rod 36 as shown in Figure 2. Should the breakage occur, the spring 38 retracts the tension rod 36 and lifts the valve disc or plug 45 against the valve seat 47 about the orifice 46. Such an arrangement is substantially free of erosion on the valve disc 45 or orifice 46 so that there is a positive sealing when it is necessary.

The apparatus of Figures 6 and 7 can be assembled by placing the spider 50, the spring 38, washers 39, and locknuts 40 on the tension rod 36. Sufficient spring tension is then produced to seat the valve 45 and the spider 50 is then tack-welded or keyed in position. Subsequently the spring tension is released and the filter tube 17 and the bottom closure 35 are placed about the tension rod 36. The locknuts 40 can then be drawn up on either end of the tension rod 36 to place the assembly in compression as described above.

From the description herein it will be apparent that the objects of the invention have been attained, however, the detailed description of the several embodiments of the invention is intended for the purpose of illustration only. Accordingly, it is contemplated that modifications can be made in the described system without departing from the scope of the invention.

What I claim is:

1. A ceramic filter for high temperature gas-solids separation which comprises in combination a tubular filter element, a separable bottom end closure on the lower end of said tubular filter element, a filter element support plate, an aperture through said plate, a flow duct communicating with said aperture, a recess in the lower face of said plate concentric with said aperture and adapted to receive the upper end of said tubular element, tie rod means within said filter element extending between said bottom end closure and the upper face of said plate through said aperture and duct, tie rod securing means exterior of said end closure, a coil spring surrounding the said tie rod above said plate and duct, and adjustable means carried by said tie rod acting on said spring for placing said spring in compression and thereby placing said tie rod in tension and said element under compression.

2. A filter unit comprising an open-ended gas-permeable ceramic tubular element of substantial wall thickness with respect to the outer diameter of said element, a metallic support and end closure plate disposed in gas-sealing contact with the lower end of said tubular element, means for supporting the filter unit including a tube sheet having gas flow valve port means in register with the upper end of said tubular element, adjustable means for retaining said end closure plate and said filter support in gas-tight relation with opposite ends of said tubular element and for maintaining said tubular element in compression, said adjustable means including a separable support member on said tube sheet adapted for gas flow therethrough, a spring-loaded tie rod means extending above said member and below said closure plate, expanding spring means acting on said tie rod to maintain said tubular element in compression and said tie rod in tension, and a valve plug on said tie rod adapted to control said valve port when said tie rod is moved axially of said aperture by said spring upon failure of said tubular element.

3. An improved high temperature gas-solids separation system of the type wherein a plurality of filter units are suspended from a tube sheet within a filter case, valve port means in said tube sheet, the filter unit which comprises an open-ended ceramic tubular element of substantial wall thickness with respect to the overall diameter of the tubular element and of substantial length, resilient support means for supporting said tubular element in a depending manner from such tube sheet, said resilient support means including an end closure for the bottom of said tubular element, a separable flow port member carried by said tube sheet and in register with each said valve port means, tie rod means extending between said end closure and said member, spring means above said member acting on said tie rod whereby said tubular element is maintained in compression and in gas sealing contact with the end closure and with the tube sheet, and a valve plug on said tie rod adapted to control said valve port means when said tie rod is moved axially of said aperture by said spring upon failure of said tubular element.

4. An improved high temperature gas-solids separation system of the type wherein a plurality of filter units are suspended from a tube sheet within a filter case, the improved filter unit which comprises a ceramic tubular element of substantial wall thickness relative to the diameter of the tubular element and of substantial length, resilient support means for supporting said tubular element in a depending manner from such tube sheet, said resilient support means including an end closure for the bottom of said tubular element, tie rod means extending between said end closure and said tube sheet, spring means above said tube sheet acting on said tie rod whereby said tubular element is maintained in compression and in gas sealing contact with the end closure and with the tube sheet, a valve port in said tube sheet, spider support means disposed between the lower end of said spring and the said tube sheet adjacent the periphery of the valve port, and valve plug means fixed to said tie rod and initially spaced from said valve port and adapted to seal said valve port in the event of failure of the tubular element which permits retraction of the tie rod by the spring means.

5. A ceramic filter for high temperature gas-solids separation which comprises in combination a tubular filter element, an end closure on the lower end of said tubular filter element, a filter support plate, an aperture through said plate, said aperture including a valve port, a recess in the lower face of said plate concentric with said aperture and adapted to receive the upper end of said tubular filter element, tie rod means extending between said closure and the upper face of said tube sheet through said aperture, tie rod securing means exterior of said end closure, a coil spring surrounding the said tie rod above said tube sheet, a spider support between the upper face of said tube sheet and the lower end of said coil spring, adjustable means carried by said tie rod adjacent said spring for placing said spring in compression and thereby placing said tie rod in tension, and a valve plug on said tie rod adapted to close said valve port when said tie rod is moved axially of said aperture by said spring in the absence of said tubular filter element.

References Cited in the file of this patent

UNITED STATES PATENTS

| | | |
|---|---|---|
| 2,048,993 | Claffey et al. | July 28, 1936 |
| 2,226,045 | Baldwin | Dec. 24, 1940 |
| 2,314,573 | Clark et al. | Mar. 23, 1943 |
| 2,771,156 | Kasten et al. | Nov. 20, 1956 |
| 2,804,168 | Church | Aug. 27, 1957 |

FOREIGN PATENTS

| | | |
|---|---|---|
| 884,062 | France | Apr. 12, 1943 |
| 981,533 | France | Jan. 17, 1951 |
| 652,931 | Great Britain | May 2, 1951 |